United States Patent
Sasagawa et al.

(10) Patent No.: US 11,188,182 B2
(45) Date of Patent: Nov. 30, 2021

(54) INPUT DEVICE

(71) Applicant: Alps Alpine Co., Ltd., Tokyo (JP)

(72) Inventors: Hideto Sasagawa, Niigata-ken (JP); Takashi Asakawa, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/926,101

(22) Filed: Jul. 10, 2020

(65) Prior Publication Data
US 2020/0348797 A1 Nov. 5, 2020

Related U.S. Application Data

(63) Continuation of application No. PCT/JP2018/048208, filed on Dec. 27, 2018.

(30) Foreign Application Priority Data

Jan. 26, 2018 (JP) .............................. JP2018-011570

(51) Int. Cl.
*G06F 3/041* (2006.01)
*G06F 3/045* (2006.01)
(Continued)

(52) U.S. Cl.
CPC .............. *G06F 3/0446* (2019.05); *B32B 7/12* (2013.01); *B32B 2457/208* (2013.01); *G06F 2203/04102* (2013.01); *G06F 2203/04103* (2013.01)

(58) Field of Classification Search
CPC ..... G06F 3/0446; G06F 3/0412; G06F 3/0443
See application file for complete search history.

(56) References Cited

U.S. PATENT DOCUMENTS

2010/0056972 A1* 3/2010 Harima ............... A61F 13/0276
602/52
2012/0249465 A1* 10/2012 Lin ...................... H05K 1/0306
345/173
(Continued)

FOREIGN PATENT DOCUMENTS

JP 11-230484 8/1999
JP 2012-119410 6/2012
(Continued)

OTHER PUBLICATIONS

International Search Report for International Application No. PCT/JP2018/048208 dated Feb. 19, 2019.
(Continued)

*Primary Examiner* — Nan-Ying Yang
(74) *Attorney, Agent, or Firm* — Beyer Law Group LLP (57) ABSTRACT

An input device has a film sensor and a cover member having a convex surface. The film sensor includes: a support substrate that has a film-like main body and an extending portion extending from an end of the main body toward the outside; a plurality of electrode portions provided on a surface of the main body; and lead patterns that extend from the main body to the extending portion and are electrically continuous to the plurality of electrodes. A surface of the main body, the surface being on the same side as the plurality of electrode portions, is attached to the convex surface through an adhesive layer. An end adhesive area, in the adhesive layer, positioned on the same side as the extending portion, has lower adhesiveness than a central adhesive area, in the adhesive layer, positioned on the same side as the central portion of the convex surface.

6 Claims, 8 Drawing Sheets

(51) Int. Cl.
  *G06F 3/044* (2006.01)
  *B32B 7/12* (2006.01)

(56) References Cited

U.S. PATENT DOCUMENTS

2013/0168336 A1* 7/2013 Kim .................. G01L 1/146
                                                211/26
2016/0179248 A1   6/2016 Nishimura et al.

FOREIGN PATENT DOCUMENTS

| | | |
|---|---|---|
| JP | 2014-35754 | 2/2014 |
| JP | 2015-215735 | 12/2015 |
| JP | 2017-151575 | 8/2017 |
| KR | 2012-0139826 | 12/2012 |
| WO | 2015/033684 | 3/2015 |

OTHER PUBLICATIONS

Korean Office Action from Korean Application No. 20207018074 dated Jul. 8, 2021.

* cited by examiner

INPUT DEVICE

CLAIM OF PRIORITY

This application is a Continuation of International Application No. PCT/JP2018/048208 filed on Dec. 27, 2018, which claims benefit of Japanese Patent Application No. 2018-011570 filed on Jan. 26, 2018. The entire contents of each application noted above are hereby incorporated by reference.

BACKGROUND OF THE INVENTION

1. Field of the Invention

The present invention relates to an input device, and more particularly to an input device having a film sensor that detects a position that a finger or the like has approached.

2. Description of the Related Art

A film sensor widely used in an input device has a sensor that detects a position at which a finger or the like has approached a detection region (in the description below, "approach" includes "touch"). In a film sensor in a mutual capacitance method, for example, an electrode on a driving side and an electrode on an output side are provided. A drive pulse is given to the electrode on the driving side, and a capacitance change caused by an approach of a finger or the like is detected with the electrode on the output side.

In some input devices of this type, a film sensor is stuck to a cover member having a convex surface. To stick a film sensor to a convex surface, a transparent adhesive layer formed from an optical clear adhesive (OCA) or the like is used.

As for film sensor sticking, Japanese Unexamined Patent Application Publication No. 2014-035754 discloses a touch sensor that can be easily mounted in a three-dimensional manner according to an electronic device having a three-dimensional shape. In this touch sensor, cutouts are formed in a right-side electrode region and left-side electrode region on a polyethylene terephthalate (PET) film so that stress, which would otherwise concentrate on electrodes and signal lines during bending, is distributed.

Japanese Unexamined Patent Application Publication No. 11-230484 discloses an attachment tool to be stuck to a curved surface and a method of sticking the attachment tool. This attachment tool has an attachment material to be stuck to the curved surface of an adherend, a pressure sensitive adhesive added to the rear surface of the attachment material, and a release sheet added to the rear surface of this pressure sensitive adhesive. Slits for preventing wrinkles are formed in two edges extending from one end of the attachment tool to another end of it so as to face each other.

Japanese Unexamined Patent Application Publication No. 2012-119410 discloses a flexible printed circuit board, a method of attaching the flexible printed circuit board, and an electronic device; the flexible printed circuit board can prevent wrinkles from being generated when the flexible printed circuit board is attached to an adherend having a three-dimensional surface. This flexible printed circuit board has substantially arc-shaped cutouts in its peripheral portion, especially its portion where strain stress is likely to concentrate during attachment.

When a film sensor is stuck to a curved surface, bending stress is likely to occur at a portion on the substrate of the film sensor, the portion (extended portion of the substrate, for example) being distant from a portion bonded to the curved surface. If a position at which this bending stress concentrates is on an electrode of the sensor or its lead wire, this causes a crack in the electrode or lead wire or causes wire breakage. Particularly when the film sensor is stuck to a curved surface, the film sensor needs to be more strongly bonded than when the film sensor is stuck to a flat surface. Therefore, in the vicinity of a boundary between a portion of an adhesive layer having a strong adhesive force and a portion where no adhesive layer is formed, that is, in the vicinity of an end of the adhesive layer on the substrate, a bending radius tends to become small due to an edge effect (stress concentration at an edge) at the end of the adhesive layer.

SUMMARY OF THE INVENTION

The present invention provides an input device that can suppress damage to electrodes in sticking of a film sensor to a convex surface by reducing an edge effect at an end of an adhesive layer.

An input device in one aspect of the present invention has a film sensor and a cover member having a convex surface. In the input device, the film sensor has: a support substrate that has a main body in a film shape and also has an extending portion extending from an end of the main body toward the outside; a plurality of electrode portions provided on a surface of the main body; and lead patterns extending from the main body to the extending portion, each lead pattern being electrically continuous to one of the plurality of electrodes. A surface of the main body, the surface being on the same side as the plurality of electrode portions, is attached to the convex surface through an adhesive layer. The adhesiveness of an end adhesive region in the adhesive layer, the end adhesive region being positioned on the same side as the extending portion, is lower than the adhesiveness of a central adhesive region in the adhesive layer, the central adhesive region being positioned on the same side as the central portion of the convex surface.

With this structure, since the adhesiveness of the end adhesive region in the adhesive layer is lower than the adhesiveness of the central adhesive region, it is possible to suppress an abrupt change in adhesive force on the boundary on the support substrate between a portion that is bonded with the adhesive layer and a portion that is not bonded. Therefore, when the film sensor is to be stuck to the cover member having the convex surface, an edge effect at the end of the adhesive layer for the curved support substrate can be reduced.

In the above input device, an adhesive area per unit area in the end adhesive region may be smaller than an adhesive area per unit area in the central adhesive region. Thus, an abrupt change in adhesive force is suppressed in a range from the central adhesive region to the end adhesive region.

In the above input device, a connection region in the main body, the connection region being positioned on the same side as the extending portion, may be positioned so that the closer the connection region is to the end portion of the main body, the more the connection region is separated from the convex surface. Thus, an abrupt change in bending is suppressed in the connection region in the main body.

In the above input device, the end adhesive region in the adhesive layer may have an adhesiveness decrescent region in which the distance between the film sensor and the convex surface is increased and adhesiveness is reduced. Thus, adhesiveness by the adhesive layer is gradually reduced toward the extending portion of the main body, suppressing an abrupt change in adhesive force.

In the above input device, the adhesiveness decrescent region may be provided so that the distance between the film sensor and the convex surface is increased and the amount of adhesive forming the adhesive layer is lessened. Thus, adhesiveness by the adhesive layer is gradually reduced toward the extending portion of the main body, suppressing an abrupt change in adhesive force.

In the above input device, the adhesiveness decrescent region may be provided so that the distance between the film sensor and the convex surface is increased and the area of the adhesive layer in contact with both of the film sensor and the convex surface is reduced when viewed in the normal direction of the convex surface. Thus, adhesiveness by the adhesive layer is gradually reduced toward the extending portion of the main body, suppressing an abrupt change in adhesive force.

In the above input device, in the adhesiveness decrescent region, the end of the adhesive layer may have a non-linear portion when viewed in the normal direction of the convex surface. Thus, stress concentration caused by the bend of the support substrate at the end of the adhesive layer is mitigated when compared with a case in which the end of the adhesive layer is linear.

In the above input device, the adhesive layer may be provided so as to adhere to the whole of an electrode region in which the plurality of electrode portions are provided. Thus, it is possible to perform strong sticking on the surface, of the main body, on which the plurality of electrode portions are provided and to suppress an abrupt change in adhesive force toward the extending portion by the above end adhesive region.

DESCRIPTION OF THE PREFERRED EMBODIMENTS

An embodiment of the present invention will be described below with reference to the drawings. In the descriptions below, like elements will be denoted by like reference characters and repeated descriptions will be appropriately omitted for members that have been described once.

The Structure of Input Device

Figure 1:
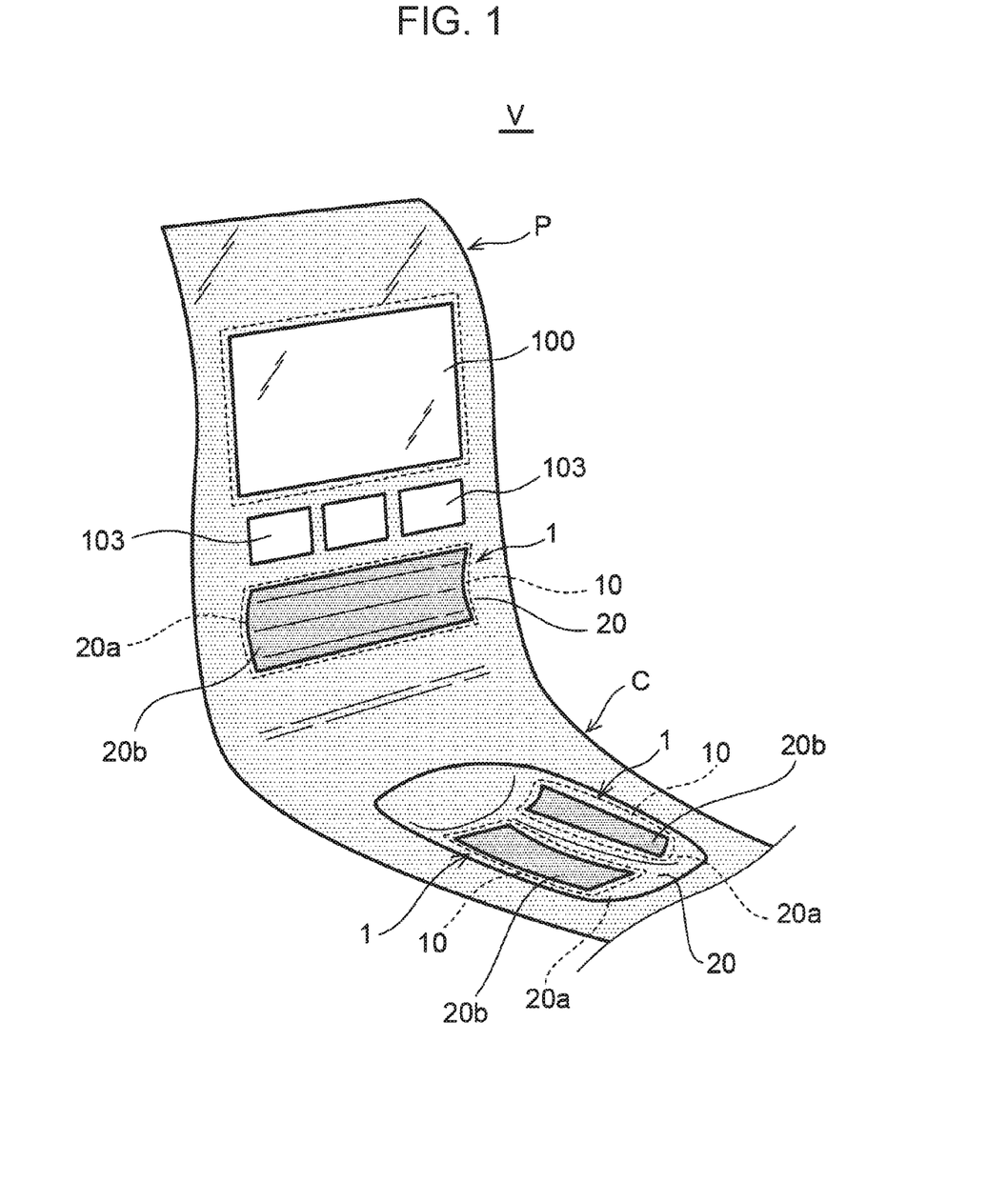
FIG. 1 is a schematic diagram illustrating an application example of an input device according to an embodiment of the present invention.
Figure 2:
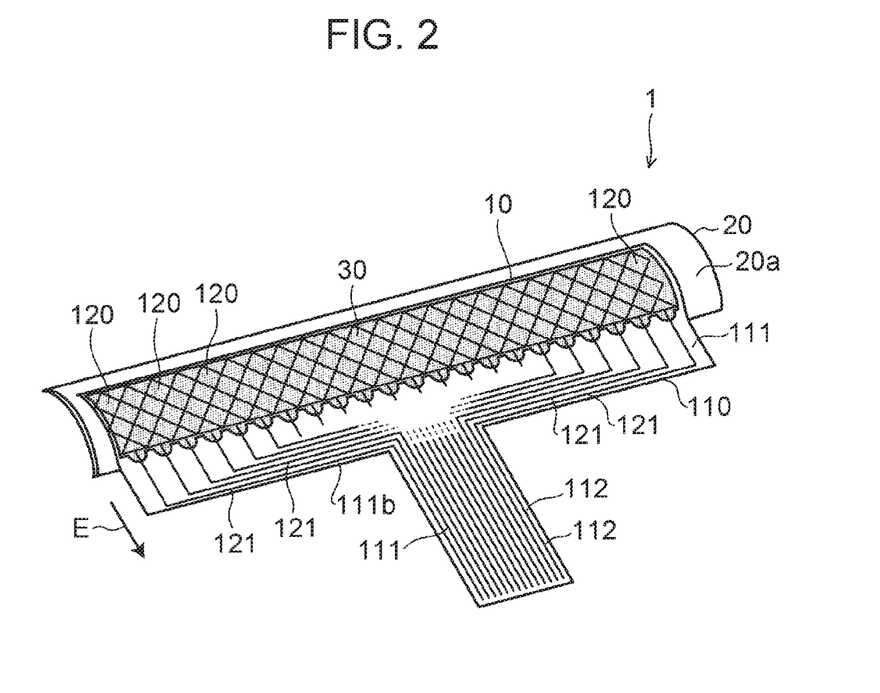
FIG. 2 is a perspective view illustrating the input device according to the embodiment.
Figure 3:
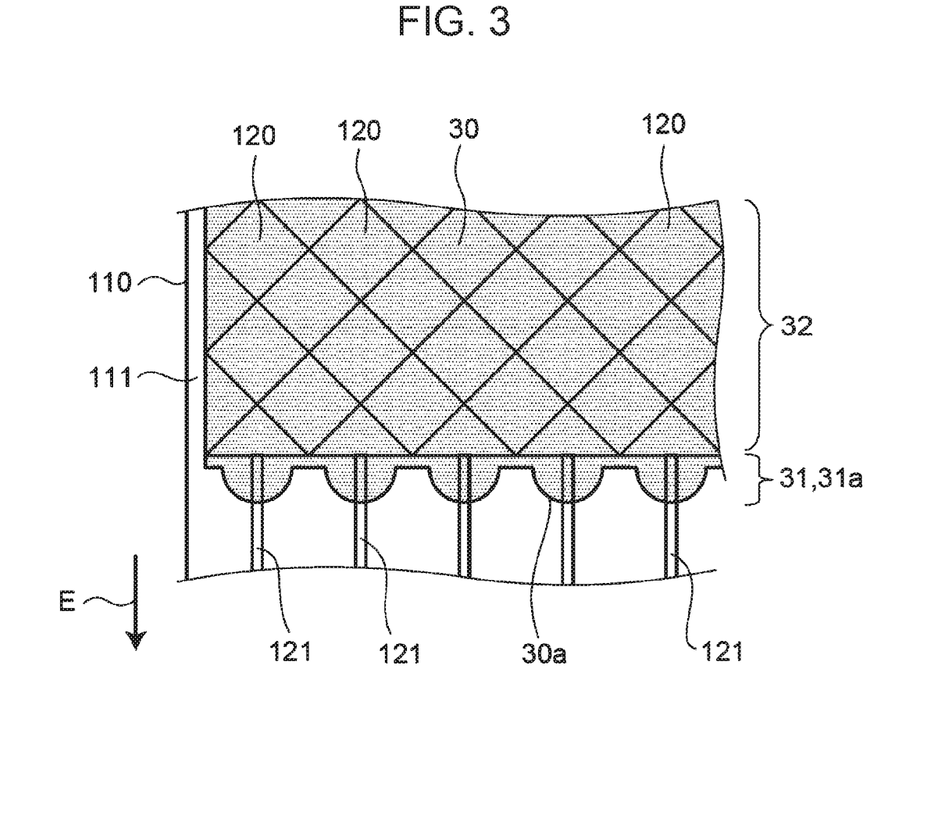
FIG. 3 is a schematic plan view in which electrode portions and an adhesive layer are partially enlarged.
Figure 4A:
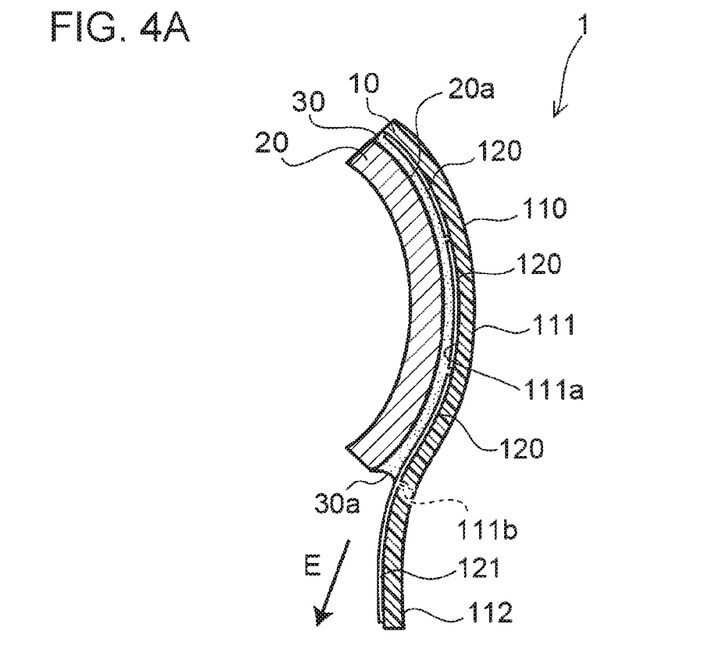
FIGS. 4A and 4B are schematic cross-sectional views of the input device according to the embodiment.
Figure 4B:
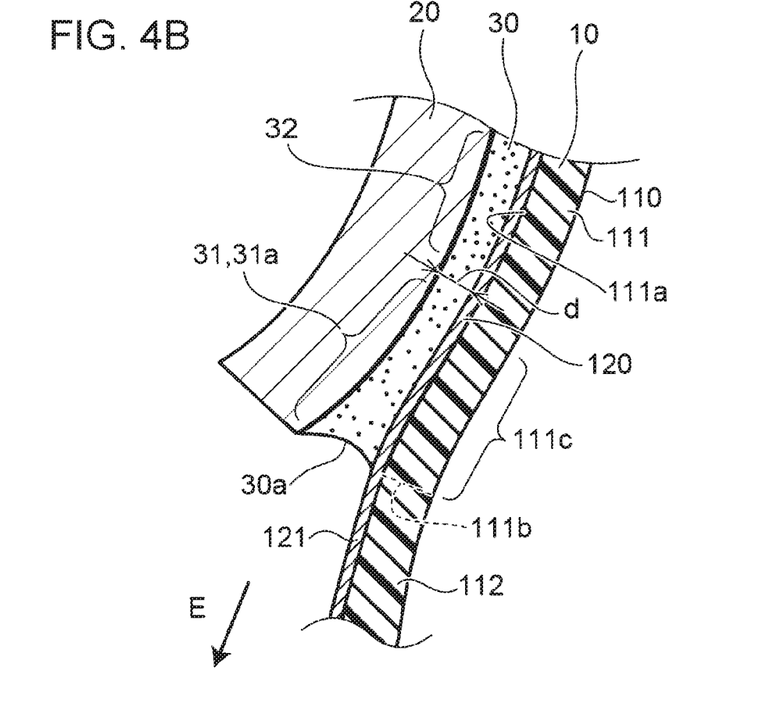

FIG. 1 is a schematic diagram illustrating an application example of an input device according to this embodiment. FIG. 2 is a perspective view illustrating the input device according to this embodiment. FIG. 3 is a schematic plan view in which electrode portions and an adhesive layer are partially enlarged. FIGS. 4A and 4B are schematic cross-sectional views of the input device according to this embodiment; FIG. 4A is a cross-sectional view when viewed in the length direction and FIG. 4B is a partially enlarged view of a connection region.

An input device 1 according to this embodiment is a touch-type detection apparatus that detects a position at which a finger or the like has approached a detection region. The input device 1 has a film sensor 10 and a cover member 20 having a convex surface 20a. In a vehicle V, such as an automobile, as illustrated in FIG. 1, the input device 1 is disposed on, for example, the rear surface side of a panel such as a flower console C or an instrument panel P on which a display device 100 and switches 103 are provided. In this embodiment, the input device 1 is disposed at a portion where a predetermined manipulation performed with a finger or the like is accepted.

The cover member 20 is disposed on the instrument panel P or flower console C. This cover member 20 has a concave surface 20b along which to make contact with a finger. The concave surface 20b may be linearly formed so that the surface can be easily traced while the finger pad is in contact with the surface. Alternatively, the concave surface 20b may be formed in a region with a predetermined width and length so that the surface can be easily traced while one or a plurality of fingers are in contact with the surface.

The rear surface side (opposite side) of the concave surface 20b of the cover member 20 is the convex surface 20a. The convex surface 20a has a shape in which an arc expands like a plane. In this embodiment, the direction in which the arc of the convex surface 20a expands will be referred to as the length direction and the direction along the arc will be referred to as the width direction.

The film sensor 10 is attached along this convex surface 20a. The film sensor 10 is, for example, a capacitive touch sensor. The film sensor 10 reads a change in capacitance on the same side as the convex surface 20a when a finger or the like approaches the concave surface 20b to detect a position. Like this, the cover member 20 is disposed so that the concave surface 20b of the cover member 20 becomes the front surface and is visible to the manipulator and that the convex surface 20a of the cover member 20 becomes the rear surface and is invisible to the manipulator.

As illustrated in FIG. 2, the film sensor 10 has a support substrate 110, a plurality of electrode portions 120, and lead patterns 121. The support substrate 110 is formed from a flexible film made of, for example, PET (polyethylene terephtalate (PET), cyclic olefin polymer (COP), or cyclic olefin copolymer (COC). The support substrate 110 may have translucency.

As illustrated in FIG. 2, the support substrate 110 has a main body 111 in a film shape and an extending portion 112 extending from an end 111b of the main body 111 toward an outside E. The main body 111 is provided in correspondence to the shape of the convex surface 20a of the cover member 20. Specifically, the main body 111 has a size large enough to form a detection region used to detect a position that a finger has approached, in correspondence to the width direction and length direction of the concave surface 20b.

The extending portion 112 is, for example, a portion extending from part of the end 111b of the main body 111 by a predetermined length. In the example illustrated in FIG. 2, the extending portion 112 extends from part of the central portion of the end 111b of the main body 111. The extending portion 112 may extend from other than the central portion of the end 111*b* or may extend from the whole of the end 111*b*.

The plurality of electrode portions 120 are disposed on a surface 111*a* (see FIGS. 4A and 4B) of the main body 111 on the same side as the convex surface 20*a*. In this embodiment, a plurality of electrode portions 120 formed in an island shape are placed longitudinally and laterally along the surface 111*a*. Thus, a change in capacitance that is caused by an approach of a finger or the like is detected and a position that the finger or the like has approached is detected. The pattern shape of the electrode portion 120 and the position detection method are not limited to the above.

When light from a display portion or light source is made to pass through the cover member 20 from its rear surface side to its front side, the plurality of electrode portions 120 are formed from a translucent conductive material. Since the plurality of electrode portions 120 are bent along the convex surface 20*a*, a translucent conductive material having relatively high flexibility is used. Therefore, translucent conductive oxides such as indium tin oxide (ITO), tin oxide ($SnO_2$), and zinc oxide (ZnO) are preferable as a material of the plurality of electrode portions 120.

Each lead pattern 121 is electrically connected to one of the plurality of electrode portions 120 and is drawn out from the main body 111 to the extending portion 112. To obtain electric continuity to the plurality of electrode portions 120 placed in a predetermined range along the surface 111*a* of the main body 111, the lead patterns 121 are drawn out along the surface 111*a* in a state in which the lead patterns 121 are electrically continuous to their relevant electrode portions 120 and are collected together toward the extending portion 112. At the leading end of the extending portion 112, pads and connectors (not illustrated) electrically continuous to the lead patterns 121 are provided for connection to an external device or circuit.

On the surface 111*a* of the main body 111 on the same side as the plurality of electrode portions 120, the film sensor 10 of this type is attached to the convex surface 20*a* of the cover member 20 through an adhesive layer 30. As the adhesive layer 30, a translucent adhesive such as an optical clear adhesive (OCA) is used. However, if the adhesive does not need to have translucency, a colored adhesive may be used.

It is preferable for the adhesive layer 30 to be provided so as to adhere to the whole of an electrode region in which the plurality of electrode portions 120 are disposed. Thus, it is possible to perform strong sticking on the surface 111*a*, of the main body 111, on which the plurality of electrode portions 120 are disposed.

As illustrated in FIGS. 3, 4A, and 4B, the adhesive layer 30 has an end adhesive region 31 positioned on the same side as the extending portion 112 and a central adhesive region 32 positioned on the central side of the convex surface 20*a*. Although depending on the area of the adhesive layer 30, the end adhesive region 31 is a region that bonds a region, in the electrode portion 120, with a predetermined width starting from the endmost on the same side as the extending portions 112. The end adhesive region 31 may extend to part of the lead patterns 121 connected to the ends of the electrode portions 120. The central adhesive region 32 is a region in which a region, positioned closer to the central portion than is the end adhesive region 31 (opposite to the extending portion 112), with a predetermined width is bonded. The adhesive region except the end adhesive region 31 may be the central adhesive region 32.

In the input device 1 according to this embodiment, the adhesiveness of this end adhesive region 31 is set so as to be lower than the adhesiveness of the central adhesive region 32. Thus, an abrupt change in adhesive force is suppressed on the boundary on the support substrate 110 between a portion that is bonded to the convex surface 20*a* with the adhesive layer 30 and a portion that is not bonded. Therefore, when the film sensor 10 is to be stuck to the cover member 20 having the convex surface 20*a*, an edge effect (stress concentration at an edge) for the curved support substrate 110 at the end 30*a* of the adhesive layer 30 can be reduced.

As illustrated in FIG. 3, an adhesiveness decrescent region 31*a* may be provided in the end adhesive region 31. In the adhesiveness decrescent region 31*a*, the distance between the film sensor 10 and the convex surface 20*a* is preferably increased and adhesiveness is preferably reduced. Due to this adhesiveness decrescent region 31*a*, adhesiveness of the main body 111 by the adhesive layer 30 toward the extending portion 112 is gradually reduced toward the outside E, suppressing an abrupt change in adhesive force.

In the example illustrated in FIG. 3, the end 30*a* of the adhesive layer 30 is not linearly but is in a concave and convex shape. As the concave and convex shape of the end 30*a*, the convex portion protrudes in a semicircular state toward the outside E. A plurality of convex portions are formed at predetermined intervals. A gap between adjacent convex portions is a concave portion. The bottom of the concave portion is linear. Since the end 30*a* of the adhesive layer 30 has this shape, the amount of adhesive material per unit area is gradually reduced toward the outside E, making it possible to gradually reduce the adhesive force.

As illustrated in FIG. 4A, when the film sensor 10 is to be stuck to the convex surface 20*a* through the adhesive layer 30, the main body 111 of the support substrate 110 is curved along the convex surface 20*a*. When the main body 111 is curved, the surface 111*a*, of the main body 111, on which a plurality of electrode portions 120 are to be formed is curved in a concave form along the convex surface 20*a*. Portions, on the support substrate 110, that are not bonded with the adhesive layer 30 (extending portion 112 and end 111*b* of the main body 111) are not tensioned toward the convex surface 20*a*. The portions, on the support substrate 110, that are not bonded with the adhesive layer 30 can then be curved according to the direction in which the extending portion 112 is curved.

With the input device 1 according to this embodiment, since the adhesiveness of the end adhesive region 31 is set so as to be lower than the adhesiveness of the central adhesive region 32, when the portions, on the support substrate 110, that are not bonded with the adhesive layer 30 are curved, abrupt bending is suppressed at the end 30*a* of the adhesive layer 30.

For example, as illustrated in the enlarged cross-sectional view in FIG. 4B, the support substrate 110 has the main body 111 and extending portion 112, and the extending portion 112 extends from the end 111*b* of the main body 111 toward the outside E. The adhesive layer 30 intervenes between this main body 111 and the convex surface 20*a*. The main body 111 includes a connection region 111*c* positioned on the same side as the extending portion 112. The connection region 111*c* is preferably formed so that the closer the connection region 111*c* is to the end 111*b* of the main body 111, the more the connection region 111*c* is separated from the convex surface 20*a*. That is, since the adhesiveness of the end adhesive region 31 is lower than the adhesiveness of the central adhesive region 32, the distance d between the convex surface 20*a* and the surface 111*a* of the main body 111 is increased toward the outside E (the closer the distance d is to the end 111b, the more the distance d is increased).

Since the distance d is increased toward the outside E, abrupt bending of the support substrate 110 is suppressed in a range from the connection region 111c to the extending portion 112 and stress concentration due to bending in this range is mitigated. This suppresses abrupt bending of the electrode portion 120 and lead pattern 121 provided in this range, preventing cracks and wire breakage, which would be otherwise caused by bending of the electrode portion 120 and lead pattern 121.

Figure 5A:
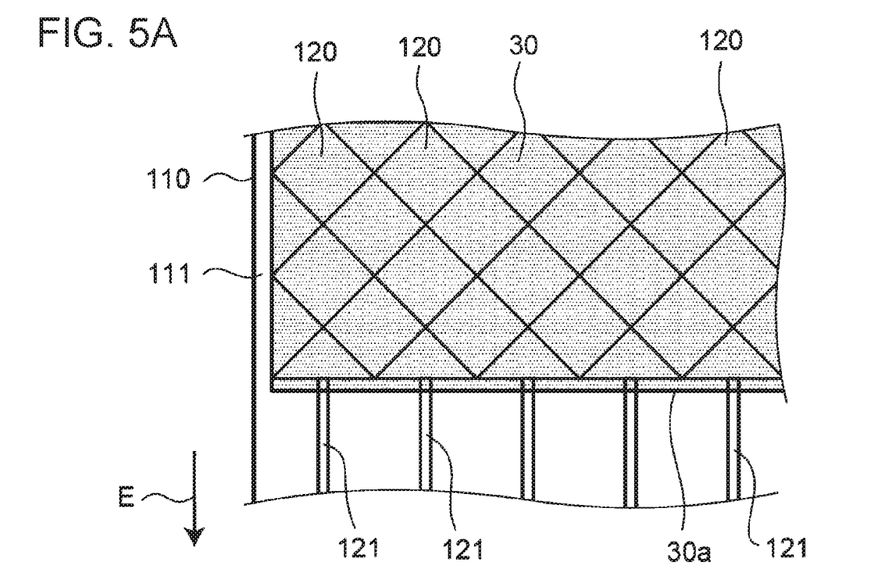
FIGS. 5A and 5B are schematic diagrams illustrating a reference example.
Figure 5B:
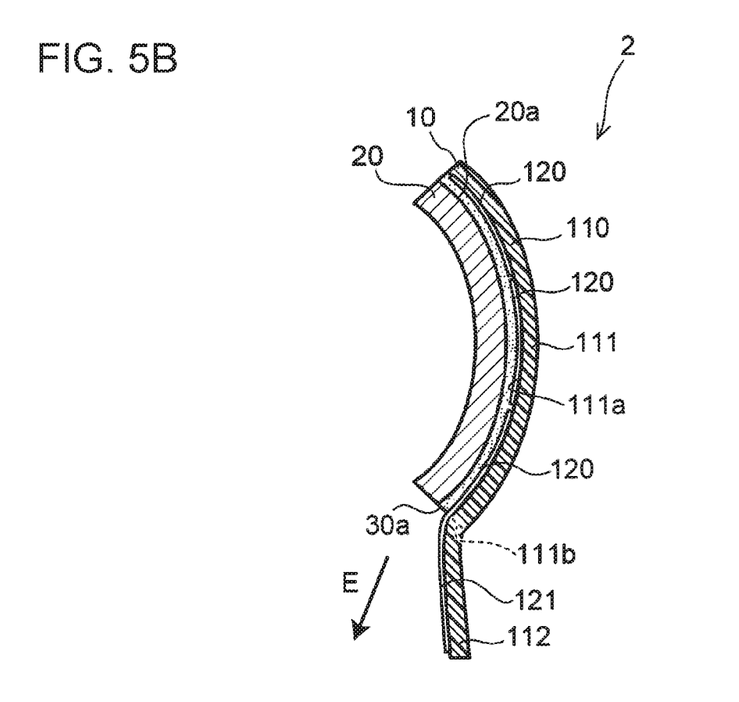

FIGS. 5A and 5B are schematic diagrams illustrating a reference example. FIG. 5A illustrates a partially enlarged plan view of electrode portions 120 and the adhesive layer 30. FIG. 5B illustrates a cross-sectional view of an input device 2 when viewed in the length direction of the cover member 20.

In the adhesive layer 30 in the input device 2 in the reference example, the end 30a on the same side as the extending portion 112 is provided linearly in the length direction.

In this case, the support substrate 110 is stuck to the convex surface 20a with the adhesive layer 30 with a uniform adhesive force. Therefore, a region, on the support substrate 110, stuck to the convex surface 20a is attached along the convex surface 20a with a strong and uniform adhesive force. However, an adhesive force is not exerted at all on a portion, on the support substrate 110, on the same side as the extending portion 112, the portion starting from the end 30a of the adhesive layer 30 (portion that is not bonded), so an abrupt change in adhesive force occurs with the end 30a taken as a boundary.

When the extending portion 112 is curved with respect to the main body 111, the support substrate 110 is bent with the linear end 30a of the adhesive layer 30 acting as a fulcrum. At this time, the support substrate 110 becomes likely to be abruptly bent on the boundary (end 30a of the adhesive layer 30) between a portion stuck so as to be curved along the convex surface 20a and a portion free from the adhesive layer 30. When the support substrate 110 is abruptly bent, stress concentrates on the bent portion of the electrode portion 120 and lead patterns 121 due to an edge effect, so cracks and wire breakage become likely to occur.

Since, in this embodiment, the adhesiveness of the end adhesive region 31 is lower than the adhesiveness of the central adhesive region 32, an abrupt change in adhesive force does not occur at the end 30a of the adhesive layer 30, so the support substrate 110 is gradually bent unlike the reference example. Therefore, cracks and wire breakage due to the bends of the electrode portion 120 and lead pattern 121 are effectively prevented.

Other Examples of the End Adhesive Region

FIG. 6A to FIG. 8B are schematic diagrams illustrating other examples of the end adhesive region.

Figure 6A:
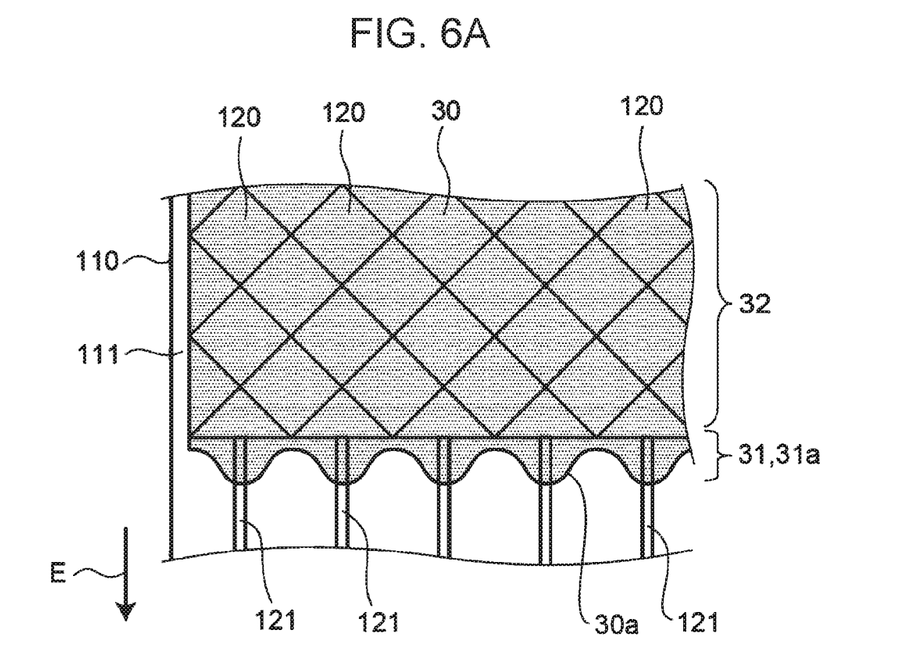
FIGS. 6A and 6B are schematic diagrams indicating other examples of the end adhesive region.

In the end adhesive region 31 of the adhesive layer 30 illustrated in FIG. 6A, the end 30a is provided in a concave and convex shape of a waveform. In the concave and convex shape of the end 30a, the convex portion and concave portion are made continuous with a smooth curve. Since the end 30a of the adhesive layer 30 has this shape, it is possible to form the adhesiveness decrescent region 31a in which the adhesive area per unit area is gradually reduced toward the outside E and the adhesive force is gradually reduced.

Figure 6B:
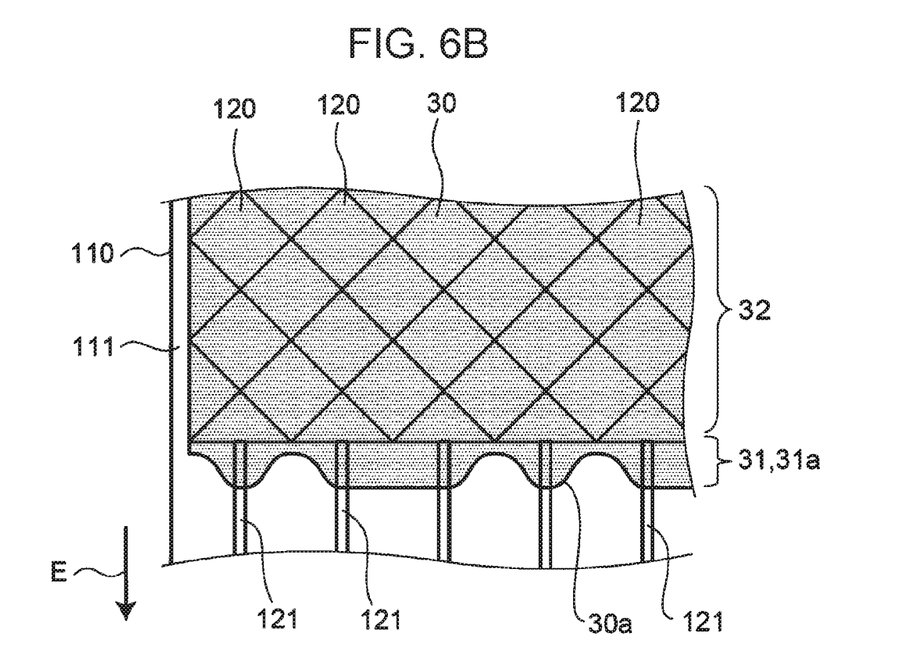

In the end adhesive region 31 of the adhesive layer 30 illustrated in FIG. 6B, the end 30a has a concave and convex shape in which a convex portion forming a smooth curve and a linear convex portion are repeated. Even in this shape, the adhesiveness decrescent region 31a in which the adhesive force is gradually reduced toward the outside E is formed. In this example, the adhesive force in the adhesiveness decrescent region 31a can be adjusted by the length of the linear convex portion.

Figure 7A:
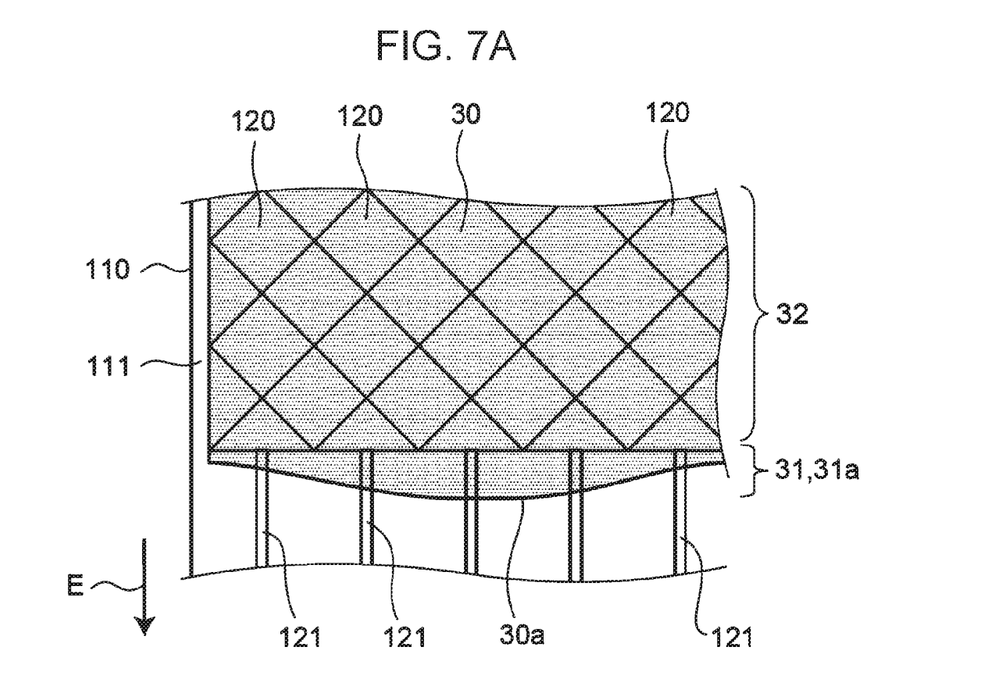
FIGS. 7A and 7B are schematic diagrams indicating other examples of the end adhesive region.

In the end adhesive region 31 of the adhesive layer 30 illustrated in FIG. 7A, the end 30a is preferably provided in a large curved shape (non-linear shape) when viewed in the normal direction of the convex surface 20a. That is, since the end 30a has a large curved shape (non-linear shape), the adhesiveness decrescent region 31a is formed in the end adhesive region 31.

Figure 7B:
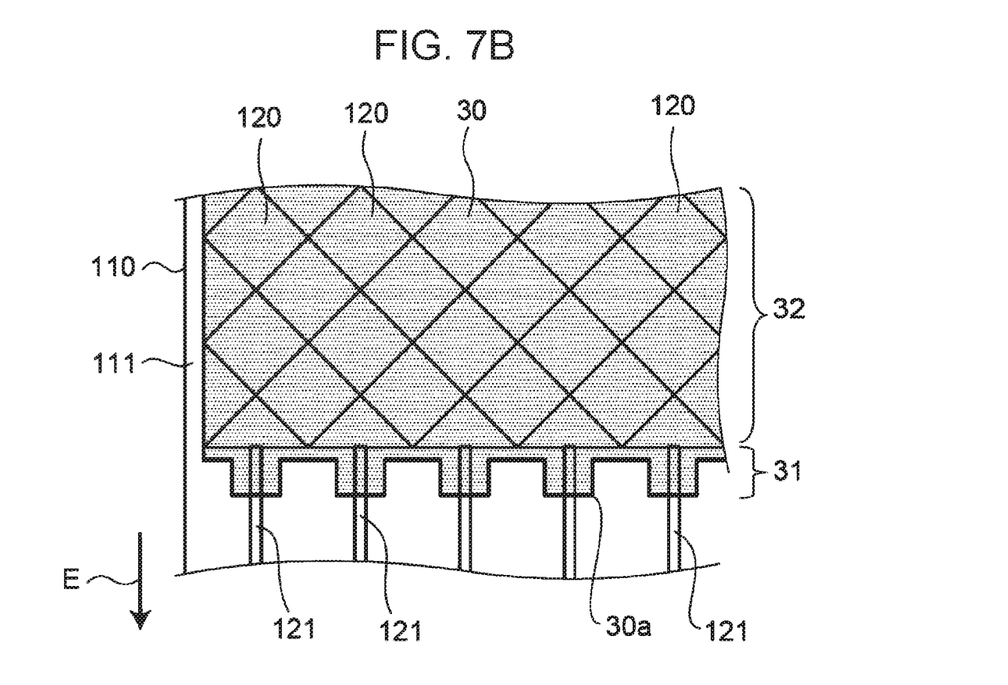

In the end adhesive region 31 of the adhesive layer 30 illustrated in FIG. 7B, the end 30a is provided in a rectangular concave and convex shape. Since the end 30a has a rectangular concave and convex shape, an adhesive force is not generated in the concave portion, so the adhesive force in the end adhesive region 31 can be made lower than the adhesive force in the central adhesive region 32. In this example, the adhesive force in the end adhesive region 31 can be adjusted by the size of the concave and convex shape of the end 30a and the interval between adjacent convex or concave portions.

Figure 8A:
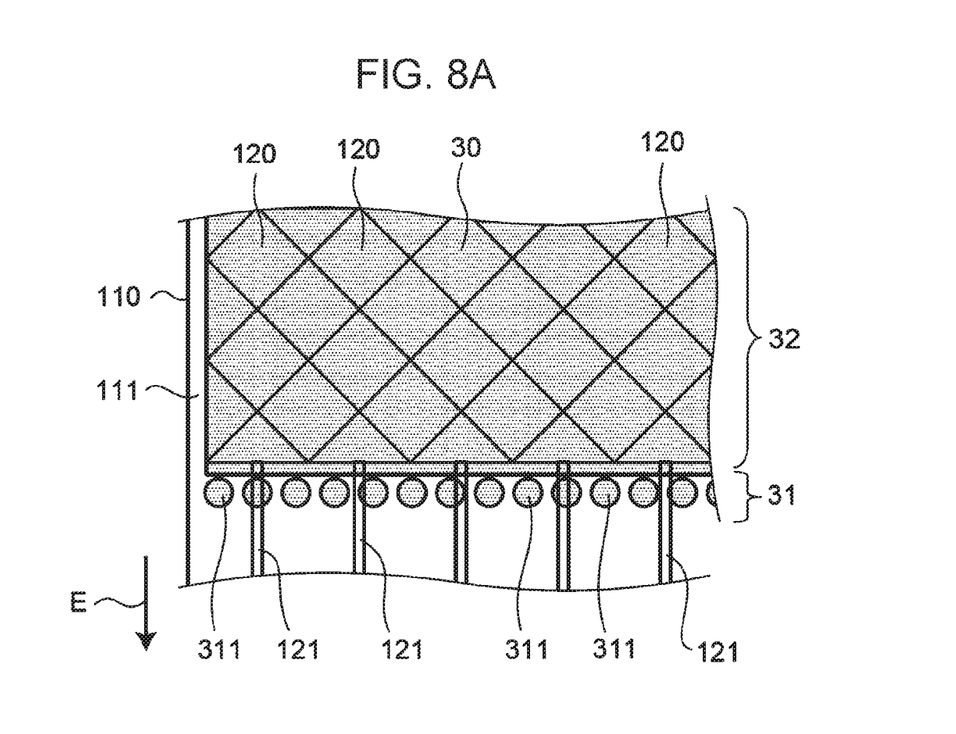
FIGS. 8A and 8B are schematic diagrams indicating other examples of the end adhesive region.

In the end adhesive region 31 of the adhesive layer 30 illustrated in FIG. 8A, adhesive regions 311, each of which is in a dot shape, are provided in the length direction. Although, in the example illustrated in the drawing, the dot shape of the adhesive region 311 is circular, the shape may be other than a circular shape. Due to the adhesive regions 311 in this dot shape, the amount of adhesive material per unit area in the end adhesive region 31 is lessened when compared with the central adhesive region 32, so the adhesive force in the end adhesive region 31 can be made lower than the adhesive force in the central adhesive region 32. In this example, the adhesive force in the adhesiveness decrescent region 31a can be adjusted by the size of the adhesive region 311 in a dot shape and the interval between adjacent adhesive regions 311.

Figure 8B:
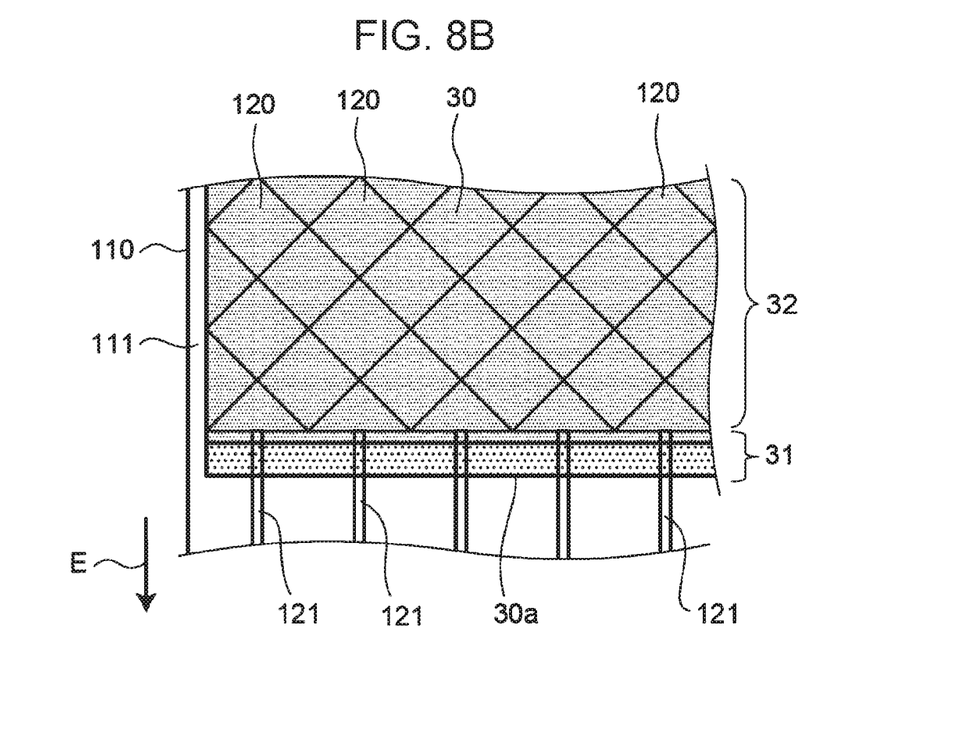

In the end adhesive region 31 of the adhesive layer 30 illustrated in FIG. 8B, an adhesive material is used by which the adhesive force in the end adhesive region 31 is lowered when compared with the adhesive force in the central adhesive region 32. When the same adhesive material is used to form the end adhesive region 31 and central adhesive region 32, processing to lower the adhesive force in only the end adhesive region 31 (for example, electron beam irradiation) may be performed.

When the adhesive force in the end adhesive region 31 of the adhesive layer 30 is made lower than the adhesive force in the central adhesive region 32 as described above, an abrupt change (edge effect) in adhesive force is suppressed at the end 30a of the adhesive layer 30. Therefore, it is possible to moderate the bending of the support substrate 110 in the end adhesive region 31, mitigate stress concentration due to the bends of the electrode portion 120 and lead pattern 121, and prevent cracks and wire breakage.

As described above, according to this embodiment, the input device 1 can be provided that can suppress, in the sticking of the film sensor 10 to the convex surface 20a of the cover member 20, damage such as cracks and wire breakage in the electrode portion 120 and lead pattern 121 due to the bending of the support substrate 110 by reducing the edge effect of the end 30a of the adhesive layer 30. It is also possible to form the end adhesive region 31 just by making the shape of the end 30a non-linear. Therefore, the edge effect can be reduced without having to pass through complex manufacturing processes.

Although this embodiment has been described above, the present invention is not limited to examples in the embodiment. For example, the scope of the present invention also includes embodiments obtained as a result of appropriately adding or deleting constituent elements to or from the embodiment described above, performing design changes to the embodiment described above, or appropriately combining features in the embodiment as long as the obtained embodiments are within the intended scope of the present invention; the additions, deletions, design changes, or combination is effected by a person having ordinary skill in the art.

What is claimed is:

1. An input device comprising:
   a film sensor including:
      a support substrate having a main body in a film shape, and an extending portion extending from an end of the main body;
      a plurality of electrode portions provided on a main surface of the main body; and
      a plurality of lead patterns each electrically connected to one of the plurality of electrodes, the plurality of lead patterns extending from within the main body to the extending portion;
   a cover member having a convex surface; and
   an adhesive layer joining the film sensor and the cover member such that the main surface of the main body is attached to the convex surface of the cover member, the adhesive layer including a central adhesive region disposed on a central portion of the convex surface, and an end adhesive region disposed on the convex surface in a vicinity of an end of the cover member on a side of the extending portion, wherein adhesiveness of the adhesive layer in the end adhesive region is lower than adhesiveness of the adhesive layer in the central adhesive region,
   wherein in the end adhesive region, the adhesive layer has an adhesiveness decreasing region in which the adhesiveness decreases as a distance between the main surface of the main body of the film sensor and the convex surface of the cover member increases,
   and wherein the adhesiveness is decreased by reducing an amount of adhesive forming the adhesive layer per unit area, as the distance increases.

2. The input device according to claim 1, wherein an adhesive area of the adhesive layer per unit area in the end adhesive region is smaller than an adhesive area of the adhesive layer per unit area in the central adhesive region.

3. The input device according to claim 1, wherein the main body further includes a connection region in which the plurality of lead patterns are connected to the plurality of electrode portions, wherein in the connection region, the closer to the end of the main body, the greater a distance from the convex surface.

4. The input device according to claim 1, wherein the adhesiveness is decreased by reducing a contact area in which the adhesive layer is in contact with both of the film sensor and the convex surface when viewed in a direction normal to the convex surface.

5. The input device according to claim 1, wherein in the adhesiveness decreasing region, an edge of the adhesive layer has a non-linear or curved shape when viewed in a direction normal to the convex surface.

6. The input device according to claim 1, wherein the adhesive layer entirely covers an electrode region in which the plurality of electrode portions are provided.

* * * * *